(12) United States Patent
Gordon et al.

(10) Patent No.: US 7,941,809 B1
(45) Date of Patent: May 10, 2011

(54) SYSTEMS AND METHODS FOR MANAGING EVENTS

(75) Inventors: Eugenia Gordon, Brooklyn, NY (US); Sheila Welch, Jersey City, NJ (US)

(73) Assignee: Morgan Stanley, New York, NY (US)

( * ) Notice: Subject to any disclaimer, the term of this patent is extended or adjusted under 35 U.S.C. 154(b) by 1050 days.

(21) Appl. No.: 11/528,486

(22) Filed: Sep. 27, 2006

Related U.S. Application Data

(60) Provisional application No. 60/721,275, filed on Sep. 27, 2005.

(51) Int. Cl.
*G06F 3/00* (2006.01)
*G06F 9/44* (2006.01)
*G06F 9/46* (2006.01)
*G06F 13/00* (2006.01)

(52) U.S. Cl. ........... 719/318; 719/320; 709/223; 726/23

(58) Field of Classification Search .................. 719/318, 719/320; 714/31; 726/22; 709/224, 223
See application file for complete search history.

(56) References Cited

U.S. PATENT DOCUMENTS

| | | | |
|---|---|---|---|
| 6,694,362 B1 * | 2/2004 | Secor et al. .................. | 709/223 |
| 7,010,593 B2 * | 3/2006 | Raymond ..................... | 709/224 |
| 7,568,019 B1 * | 7/2009 | Bhargava et al. ............. | 709/223 |
| 7,694,115 B1 * | 4/2010 | Porras et al. .................. | 713/1 |
| 2002/0138571 A1 * | 9/2002 | Trinon et al. ................. | 709/204 |
| 2002/0174000 A1 * | 11/2002 | Katz et al. ..................... | 705/7 |
| 2002/0194048 A1 * | 12/2002 | Levinson ........................ | 705/9 |
| 2004/0044912 A1 * | 3/2004 | Connary et al. .............. | 713/201 |
| 2004/0250112 A1 * | 12/2004 | Valente et al. ................ | 713/200 |
| 2004/0260947 A1 * | 12/2004 | Brady et al. .................. | 713/201 |
| 2005/0262397 A1 * | 11/2005 | Fitzgerald et al. ............. | 714/31 |

* cited by examiner

*Primary Examiner* — Diem K Cao
(74) *Attorney, Agent, or Firm* — K&L Gates LLP

(57) ABSTRACT

An event management system initializes an event associated with a process. Corrective actions are executed to resolve the event. The corrective actions are monitored after the event is resolved to continuously improve the process.

13 Claims, 14 Drawing Sheets

400

Invoke ITC3 - Welcome Mark Juviler

Fill From Falcon/Code Red: Falcon WOT P0003543    Code Red Fill

Invoke: ITC3    Outage Start Time: 02/05/2005 10:00 Am (EST) — 402

Outage Manager: Genna Gordon (genna)

Outage Brief Description: PIWAS122 Server Does not re-start    Attachments: ESP Screen Shot.doc Spell Check   Full Screen Problem Description: — 404

Business Impact: Trading Systems Down — 406

Server or Hardware or System Name:

| Name |
|---|
| PIWAS122 |
| PIWAS122 |
| <> |

ESP lookup...

Applications:

| Application |
|---|
| Active View |
| ESP |
| <> |

Turn Over #

| Turn Over |
|---|
| 225165 |
| 227653 |
| <> |

View

Affected Regions:

| Region |
|---|
| All |
| Asia Pacific |
| <> |

Affected BU's:

| BU | Users |
|---|---|
| All | |
| CB01 | 200 |
| <> | |

Affected Brancher:

| Branch |
|---|
| All |
| Amsterdam |
| <> |

Affected Building:

| Building |
|---|
| All |
| Amsterdam |
| <> |

Set Up Core Team Assessment Call

408

Participants: markju, feldmanj    LDAP

Regional Mail groups:
itc3-am-assessment
itc3-am-bu
itc3-am-follow-up
itc3-am-notify Add ->
<- Remove itc3-am-assessment
markju
feldmanj Conf call Dial-In#: 800-761-B522 (US) - Passcode 754-2487

410

Iniate, E-mail, JAM & Bleep

Edit Auto eMail/Page/JAM    Book Tickets:

☑ Send E-Mail    ☑ Book Falcon Ticket
☑ Send Page     ☐ Book Code Red Ticket
☑ Send JAM Save & Next ->

Dashboard
Status &Calls
Invoke
Join Calls
Outage Manager
Post Mortem
Post Outage
Reports

File Edit View Favorites Tools Help

Address http://localhost/Webapplication1/Invoke.aspx  Go Links»

- Dashboard
- Status &Calls
- Invoke
- Join Calls
- Outage Manager
- Post Mortem
- Post Outage
- Reports Core Team ITC3 Assessment Call (Edit) - Welcome Genna Gordon  (In Progress - 3hrs 25 minutes)

ITC3 Summary for: 1000324   Outage Start 02/05/2005 10:00 AM (EST) - Duration 225 minutes

| Outage Manager: | Genna Gordon (genna) | Phase: | Assessment | ETA: | 1 Hour |
|---|---|---|---|---|---|
| Status: | Open | Outage Severity: | Major | | |

Outage Brief Description: PIWAS122 Server Does not re-start

Problem Description: Unable to Reboot PIWAS122, causing an Outage for All Regions Attachments: ESP Screen Shot. doc   View Attachment Business Impact: Trading Systems Down Falcon Ticket: P0003543

Impact: Server PIWAS122, Application ESP, Affecting IT in All Regions

Resolution: Not Yet Identified

608

Core Team Assessment Call

Core Team Call (In Progress -3hrs 25 minutes)

- Invited ? Yes
- Call Type: Assessment
- Manager: Genna Gordon
- Click to Dial In: 800-761-8522 (US) - Pass
- Call History:
- Next Call: 02/05/2005 04:00 pm (EST) — Starts in 30 Minutes
- Next Call Type: Core Team Follow-Up

606

Roll Call: — 604 — 602

On the Call

| Name | Silo | Dept | Online |
|---|---|---|---|
| Celso Done | EI | Cust Eng & Support | Yes |
| Deborah Speyer | EI | Cust Eng & Support | Yes |
| Jay Feldman | EI | IMG | No |
| Mark Juvier | EI | IMG | Yes |
| Genna Gordon | EI | Risk Management | Yes |
| Richard Chalker | EI | Risk Management | Yes |
| <> | | | |

Actions, Comments & Minutes

Call Summary

Actions   Full Screen  Add  Update  Delete

| ID | Group | Type# | Action | Assign To | Date Assigned | Date Due | Complete |
|---|---|---|---|---|---|---|---|
| 2 | Core Team | Communication | Call head of BU and provide update | genna | 2/5/2005 2:00 PM | 2/6/2005 2:30 PM | No |
| 3 | Core Team | Assessment | Contact DBA | genna | 2/5/2005 2:03 PM | 2/6/2005 2:30 PM | No |
| 4 | Core Team | Assessment | Bring on IMG Team | speyer | 2/5/2005 2:05 PM | 2/6/2005 2:30 PM | No |

610

Comment

| Comment Type | Comment Date | Participant | Comment |
|---|---|---|---|
| Core Team | 2/5/2005 2:07:00 PM | genna | This appears to be affecting trading |
| Core Team | 2/5/2005 2:08:00 PM | chalker | Concerned about Trading System |
| Core Team | 2/5/2005 2:09:00 PM | speyer | I have a screen shot of the problem |
| <> | | | |

```
                                                                    ⊟□X
File Edit View Favorites Tools Help
Address  http://localhost/Webapplication1/Invoke.aspx          ⌄ → Go Links »
```

| Dashboard | |
|---|---|
| Status &Calls | ITC3 Outage Manager Administration - Welcome Genna Gordon |
| Invoke | ITC3 Summary for: 1000324    Outage Start 02/05/2005 10:00 AM (EST) - Duration 225 minutes |
| Join Calls | |
| Outage Manager | |
| Post Mortem | |
| Post Outage | |
| Reports | |

Status: Open   Resolve Cancel  Phase: Assessment ⌄   Estimated ETA: 1 Hour ⌄

— 702

Falcon/TOR Ticket: P0003543

Outage Manager: Genna Gordon (genna)   Tech Manager: Mark Juvlier (markju)

Outage Severity (Chart): Major ⌄

Outage Brief Description: PIWAS122 Server Does not re-start

Spell Check  Full Screen

Problem Description: [        ]   Attachments: ESP Screen Shot. doc

Business Impact: [        ]

Resolution: [        ]

| Server or Hardware or System Name: | Name | Applications: | Application | Turn Over #: | Turn Over |
|---|---|---|---|---|---|
| | PIWAS122 | | Active View | | 225165 |
| | PIWAS122 | | ESP | | 227653 |
| | <> | | <> | | <> |
| Affected Regions: | Region | Affected BU's: | BU | Users | Affected Brancher: | Branch | Affected Building: | Building |
| | All | | All | | | All | | All |
| | Asia Pacific | | CB01 | 200 | | Amsterdam | | Amsterdam |
| | <> | | <> | | | <> | | <> |

Actions:    Full Screen  Add  Update  Delete

| ID | Group | Type# | Action | Assign To | Date Assigned | Date Due | Complete |
|---|---|---|---|---|---|---|---|
| 1 | Technical | Fix | Have DBA increase log size to 500 meg | markju | 2/5/2005 12:00 AM | 2/6/2005 12:00 AM | No |
| 2 | Core Team | Communication | Call head of BU and provide update | genna | 2/5/2005 12:00 PM | 2/6/2005 12:00 PM | No |
| <> | | | | | | | |

Comments:

| Comment Type | Comment Date | Participant | Comment |
|---|---|---|---|
| Technical | 2/5/2005 3.04:00 PM | markju | I think the problem is with the database |
| Technical | 2/5/2005 3.05:00 AM | feldmary | I think we should contact ODBA |
| Technical | 2/5/2005 3.05:23 AM | lomasj | The log appears to be corrupt |
| <> | | | |

704            Managing Calls  706              708

| Core Team Call (In Progress -3hrs 25 minutes) | Core Team Call (In Progress -3hrs 25 minutes) | Core Team Call (In Progress -3hrs 25 minutes) |
|---|---|---|
| Status: In Progress  Stop Call | Status: Pending  Start Call | Status: Not Scheduled  Stop Call |
| Call Type: Assessment  Join Call | Call Type: | Call Type:  Join Call |
| Manager: Genna Gordon  Re-Assign | Manager: Mark Juvlier  Re-Assign | Manager: Deborah Speyer  Re-Assign |
| Click to Dial In 800-761-8522 (US) - Passci ⌄ | Click to Dial In 800-761-8522 (US) - Passci ⌄ | Click to Dial In 800-761-8522 (US) - Pass ⌄ |
| Attending: Richard Chalker-ITC3 (Onl, Genna Gordon-ITC3 (Onfin, Jay Feldman-MG | Participants: Mark Juvlier-IMG (Online), John Tomeszewski - IMG, Colin Fletcher - IMG | Participants: |
| Assign Participants | Assign Participants | Assign Participant |
| Call History: | Call History: | Call History: |
| Next Call: 02/05/2005 04:00 pm (EST)  Starts in 30 Minutes  Start Now | Next Call: 02/05/2005 04:00 pm (EST)  Starts in 2 hours  Start Now | Next Call:  Not Scheduled  Start Now |
| Next Call Type: Follow-Up | Next Call Type: Technical | Next Call Type: BU Briefing |
| Edit Auto eMail  Send End of Call ⌄ Send Now | Edit Auto eMail  Send End of Call ⌄ Send Now | Edit Auto eMail  Send End of Call ⌄ Send Now |

File Edit View Favorites Tools Help  902

Address: http://localhost/Webapplication1/Invoke.aspx

- Dashboard
- Status &Calls
- Invoke
- Join Calls
- Outage Manager
- Post Mortem
- Post Outage
- Reports Technical Follow Up Call- Welcome Jay feldman    (In Progress - 5 minutes)

ITC3 Summary for: 1000324    Outage Start 02/05/2005 10:00 AM (EST) - Duration 225 minutes

| Outage Manager: | Genna Gordon (genna) LDAP | Phase: | Technical Follow Up | ETA: | 1 Hour |
| Status: | Open | Outage Severity: | Major | | |

| Outage Brief Description: | PIWAS122 Server Does not re-start | | View Attachment |
| Problem Description: | Unable to Reboot PIWAS122, causing an Outage for All Regions | Attachments: | ESP Screen Shot. doc |
| Business Impact: | Trading Systems Down | Falcon Ticket | P0003543 |
| Impact: | Server PIWAS122, Application ESP, Affecting IT in All Regions | | |
| Resolution: | Not Yet Identified | | |

904

Technical Follow Up Call

Technical Call In Progress (5 Minutes)

| Invited ? | Yes |
| Call Type: | Technical |
| Manager: | Mark Juviler |
| Click to Dial In | 800-761-8522 (US) - Pass |
| Call History: | |
| Next Call: | 02/05/2005 0200 pm (EST) Starts in 2 Hours |
| Next Call Type: | Technical |

Roll Call:
On the Call

| Name | Silo | Dept | Online |
|---|---|---|---|
| Celso Done | EI | Cust Eng & Support | Yes |
| Deborah Speyer | EI | Cust Eng & Support | Yes |
| Jay Feldman | EI | IMG | No |
| Mark Juviler | EI | IMG | Yes |
| Genna Gordon | EI | Risk Management | Yes |
| Richard Chalker | EI | Risk Management | Yes |
| <> | | | |

View Missing Details

906

Actions, Comments & Minutes

Call Summary:

Actions:    Full Screen  Add  Update  Delete

| ID | Group | Type# | Action | Assigned To | Date Assigned | Date Due | Complete |
|---|---|---|---|---|---|---|---|
| 1 | Technical | Fix | Have DBA increase log size to 500 meg | markju | 2/5/2005 12:00 AM | 2/6/2005 12:00PM | No |

Comment:

| Comment Type | Comment Date | Participant | Comment |
|---|---|---|---|
| Technical | 2/5/2005 3:04:00 PM | markju | I think the problem is with the Database |
| Technical | 2/5/2005 3:05:00 AM | feldmanj | I think we should contact ODBA |
| Technical | 2/5/2005 3:05:23 AM | tomasj | The log appears to be corrupt |
| <> | | | |

| | |
|---|---|
| Dashboard | |
| Status &Calls | BU Briefing Call- Welcome Deborah Speyer  (In Progress - 5 minutes) |
| Invoke | ITC3 Summary for: 1000324   Outage Start 02/05/2005 10:00 AM (EST) - Duration 225 minutes |
| Join Calls | |
| Outage Manager | |
| Post Mortem | |
| Post Outage | |
| Reports | |

1002

Outage Manager: Genna Gordon (genna)  Phase: Technical Follow Up  ETA: 1 Hour
Status: Open  Outage Severity: Major
Outage Brief Description: PIWAS122 Server Does not re-start   View Attachment
Problem Description: Unable to Reboot PIWAS122, causing an Outage for All Regions  Attachments: ESP Screen Shot. doc
Business Impact: Trading Systems Down   Falcon Ticket: P0003543
Impact: Server PIWAS122, Application ESP, Affecting IT in All Regions
Resolution: Not Yet Identified

1004

BU Briefing Call

BU Briefing Call In Progress (5 Minutes)

Invited?: No
Call Type: BU
Manager: Deborah Speyer
Click to Dial In: 800-761-8522 (US) - Pass
Call History:
Next Call: Not Selected
Next Call Type:

Roll Call:
On the Call

| Name | Silo | Dept | Online |
|---|---|---|---|
| Celso Done | EI | Cust Eng & Support | Yes |
| Deborah Speyer | EI | Cust Eng & Support | Yes |
| Jay Feldman | EI | IMG | No |
| Mark Juviler | EI | IMG | Yes |
| Genna Gordon | EI | Risk Management | Yes |
| Richard Chalker | EI | Risk Management | Yes |
| < > | | | |

View Missing Detail

1006

Actions, Comments & Minutes

Call Summery:

Actions                                    Full Screen  Add  Update  Delete

| ID | Group | Type# | Action | Assigned To | Date Assigned | Date Due | Complete |
|---|---|---|---|---|---|---|---|
| 1 | Technical | Fix | Have DBA increase log size to 500 meg | markju | 2/5/2005 12:00 AM | 2/6/2005 12:00AM | No |

Comment

| Comment Type | Comment Date | Participant | Comment |
|---|---|---|---|
| Technical | 2/5/2005 3:04:00 PM | markju | I think the problem is with the Database |
| Technical | 2/5/2005 3:05:00 AM | feldmanj | I think we should contact ODBA |
| Technical | 2/5/2005 3:05:23 AM | tomasj | The log appears to be corrupt |
| < > | | | |

File Edit View Favorites Tools Help
Address: http://localhost/Webapplication1/Invoke.aspx

| Dashboard |
| Status &Calls |
| Invoke |
| Join Calls |
| Outage Manager |
| Post Mortem |
| Post Outage |
| Reports |

ITC3 Post Outage Follow Up- Welcome Jay Feldman

ITC3 Summary for: 1000324 — Resolved- Total Duration 4 Hours 37 Minutes

| Field | Value | | | |
|---|---|---|---|---|
| Status: | Resolved | Phase: | Post Outage Follow-Up | Severity: Severe |
| Outage Start Time: | 02/05/2005 10:00 AM (EST) | End: | 02/05/2005 10:00 AM (EST) | Outage Duration: 4 Hours 37 Minutes |
| Outage Manager: | Genna Gordon (genna) | | | LDAP |
| Technical Manager: | Mark Juviler (markju) | | | |
| BU Briefing Manager: | Deborah Speyer (speyer) | | | View Attachment |
| Outage Brief Description: | PIWAS122 Server Does not re-start | | Attachments: | ESP Screen Shot. doc |
| Problem Description: | Unable to Reboot PIWAS122, causing an outage for All Regions | | | |
| Business Impact: | Trading Systems Down | | TurnOver #: | 225165   View |
| Impact: | Server PIWAS122, Application ESP, Affecting IT in All Regions | | | |
| Resolution & Followup: | Log Space Increased | | | |
| Root Cause: | Bad Chip on Server | | | |

Time Line:

1204 → Time In Each Phase (bar chart: Minutes 0–160, phases: Assessment, Technical, BU Briefing, Resolution, Post Mortem, Post Outage — ITC3 Phase)

Actions: Open    Full Screen  Add  Update  Delete

| ID | Group | Type# | Action | Assign To | Date Assigned | Date Due | Complete |
|---|---|---|---|---|---|---|---|
| 2 | Core Team | Post Mortem | Evaluate Server in Web Form | genna | 2/5/2005 2:00 PM | 2/6/2005 2:30 PM | No |
| 3 | Core Team | Assessment | Install new Patch for Windows 2003 | genna | 2/5/2005 2:03 PM | 2/6/2005 2:30 PM | No |
| 4 | Core Team | Assessment | Impact Turnover Schedule | speyer | 2/5/2005 2:05 PM | 2/6/2005 2:30 PM | No |

Send Edit E-Mail    Exit    View In Falcon    View In Code Red    Do Process Review

SYSTEMS AND METHODS FOR MANAGING EVENTS

CROSS-REFERENCE TO RELATED APPLICATION

This application claims the benefit of U.S. Provisional Patent Application Ser. No. 60/721,275, entitled "SYSTEMS AND METHODS FOR MANAGING EVENTS," and filed Sep. 27, 2005, the specification for which is hereby incorporated by reference.

BACKGROUND

This application discloses an invention that is related, generally and in various embodiments, to systems and methods for managing events that impact an information technology system.

For many entities, the response to events that impact their information technology system is conducted on a less than consistent basis. Confusion and frustration are often experienced because event information may be spread among multiple applications, may not be accessible from certain locations, and in some cases may not be available at all.

SUMMARY

In one embodiment a method to initialize an event associated with a process at an event management system, execute corrective actions to resolve the event and monitor the corrective actions after the event is resolved to continuously improve the process.

DESCRIPTION OF THE DRAWINGS

FIGS. 4-14 illustrate various examples of information provided by the system during execution of the method.

DETAILED DESCRIPTION

The figures and descriptions of the disclosed invention have been simplified to illustrate elements that are relevant for a clear understanding of the disclosed invention. It should be understood that the methods, products, and systems described below may include various other processes, components, and elements in actual implementation.

In one general respect, this application discloses a system for managing events that impact an information technology system. In another general respect, this application discloses a method for managing events that impact an information technology system.

Aspects of the disclosed invention may be implemented by a processor, computer system and/or by a computer program stored on a computer readable medium. The computer readable medium may comprise a disk, a device, and/or a propagated signal.

Other features and advantages will be apparent from the following description, including the drawings, and from the claims.

Figure 1:
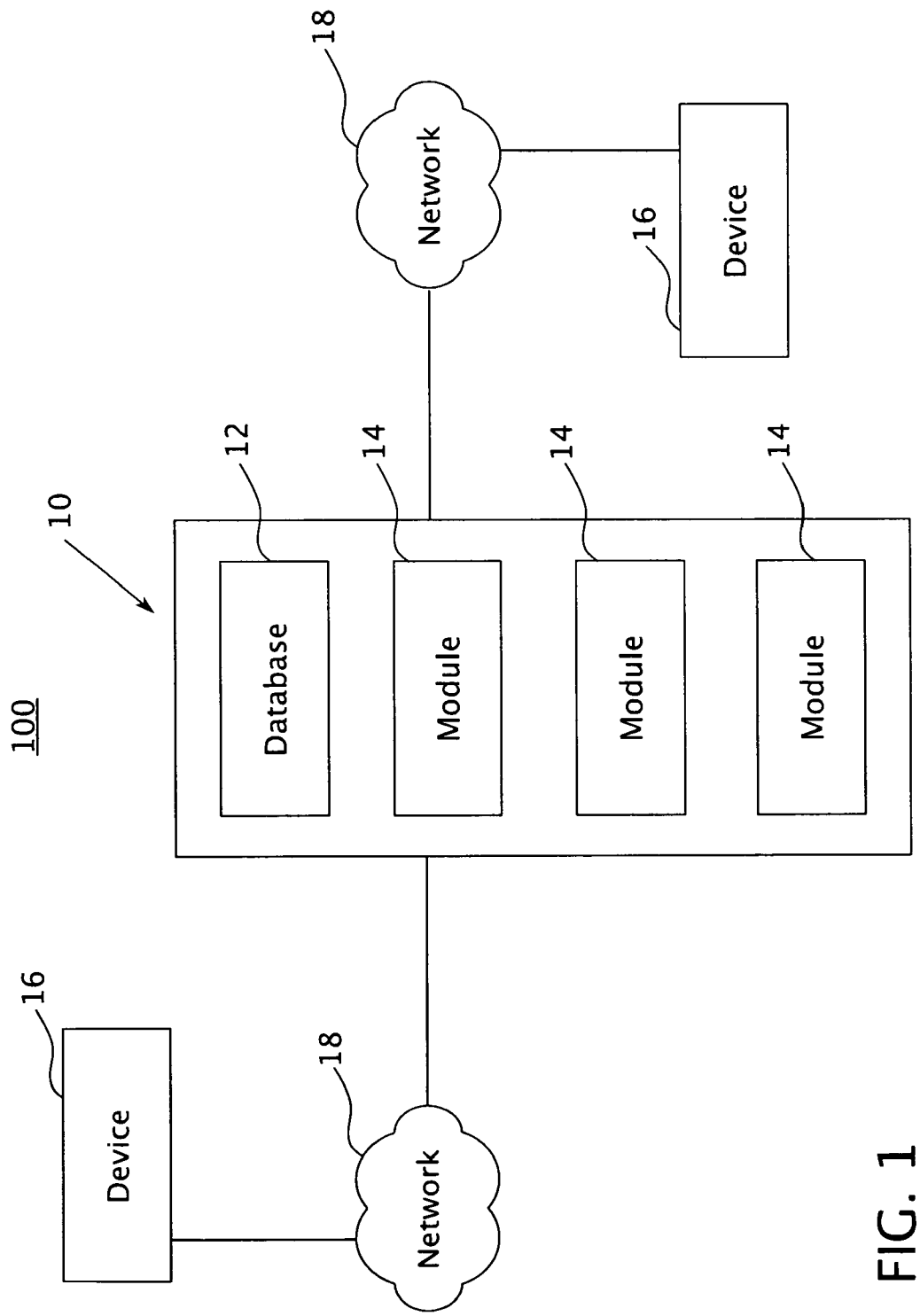
FIG. 1 illustrates one embodiment of a system for managing an event.

FIG. 1 illustrates one embodiment of a distributed system 100. The distributed system 100 comprises one embodiment of a system 10 for managing an event. As used herein, the word event may refer generally to an event that impacts an information technology system, although the term is not necessarily limited in this context. For a financial services entity, an outage that impacts its information technology system also may impact its risk portfolio. The embodiments associated with the didtributed system 100 are not limited in this context.

The system 10 comprises a database 12 and a number of different modules 14 that are integrated with one another to provide the functionality of the system 10. Although only three of the modules 14 are shown in FIG. 1, it is understood that the system 10 may include any number of the modules 14. In one embodiment, the database 12 may be a centralized, searchable database to store information relevant to any number of events.

The modules 14 may be implemented utilizing any suitable computer language (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. The modules 14 (e.g., software application, computer program) may be stored on a computer-readable medium (e.g., disk, device, and/or propagated signal) such that when a computer reads the instructions stored on the medium, the functions described herein are performed.

The system 10 may be utilized to capture, manage and report events. For example, the system 10 may be utilized to facilitate communication during an event, provide simplified entry of event information that is accessible by a number of groups, facilitate easy communication and dissemination of time sensitive information, allow for detailed analysis or review of documentation of a finished event (e.g., post mortem), improve the management of follow up actions, and enhance data integrity associated with event reporting. The system 10 is structured and arranged such that all event information may be hosted at a single location, and users may manage every event from start to finish.

In general, the system 10 may be accessible by a user via a device 16 in communication with a network 18 that is in communication with the system 10. The device 16 may be embodied as, for example, a personal computer, a workstation, a laptop computer, a network-enabled personal digital assistant, a network-enabled mobile telephone, etc. The device 16 may be in wired or wireless communication with the network 18. A user may view the progress of a particular event at any given time via a display screen of the device 16. According to various embodiments, a user may access a high-level view of all events in an environment by utilizing simple search/sort functionality. Armed with this information, a user may filter the event information based on multiple criteria (e.g., progress, severity, etc.). Any number of users may access the system 10 via any number of the devices 16.

The network 18 may include wired or wireless data pathways in communication with the system 10. The network 18 may include any type of delivery system including, but not limited to, a local area network (e.g., Ethernet), a wide area network (e.g. the Internet and/or World Wide Web), a telephone network (e.g., analog, digital, wired, wireless, PSTN, ISDN, GSM, GPRS, and/or xDSL), a packet-switched network, a radio network, a television network, a cable network, a satellite network, and/or any other wired or wireless communications network configured to carry data. The network 18 may include elements, such as, for example, intermediate nodes, proxy servers, routers, switches, and adapters configured to direct and/or deliver data.

In general, the system 10 may be structured and arranged to communicate with the network 18 using various communication protocols (e.g., HTTP, TCP/IP, UDP, WAP, WiFi, Bluetooth) and/or to operate within or in concert with one or more other communications systems.

Figure 2:
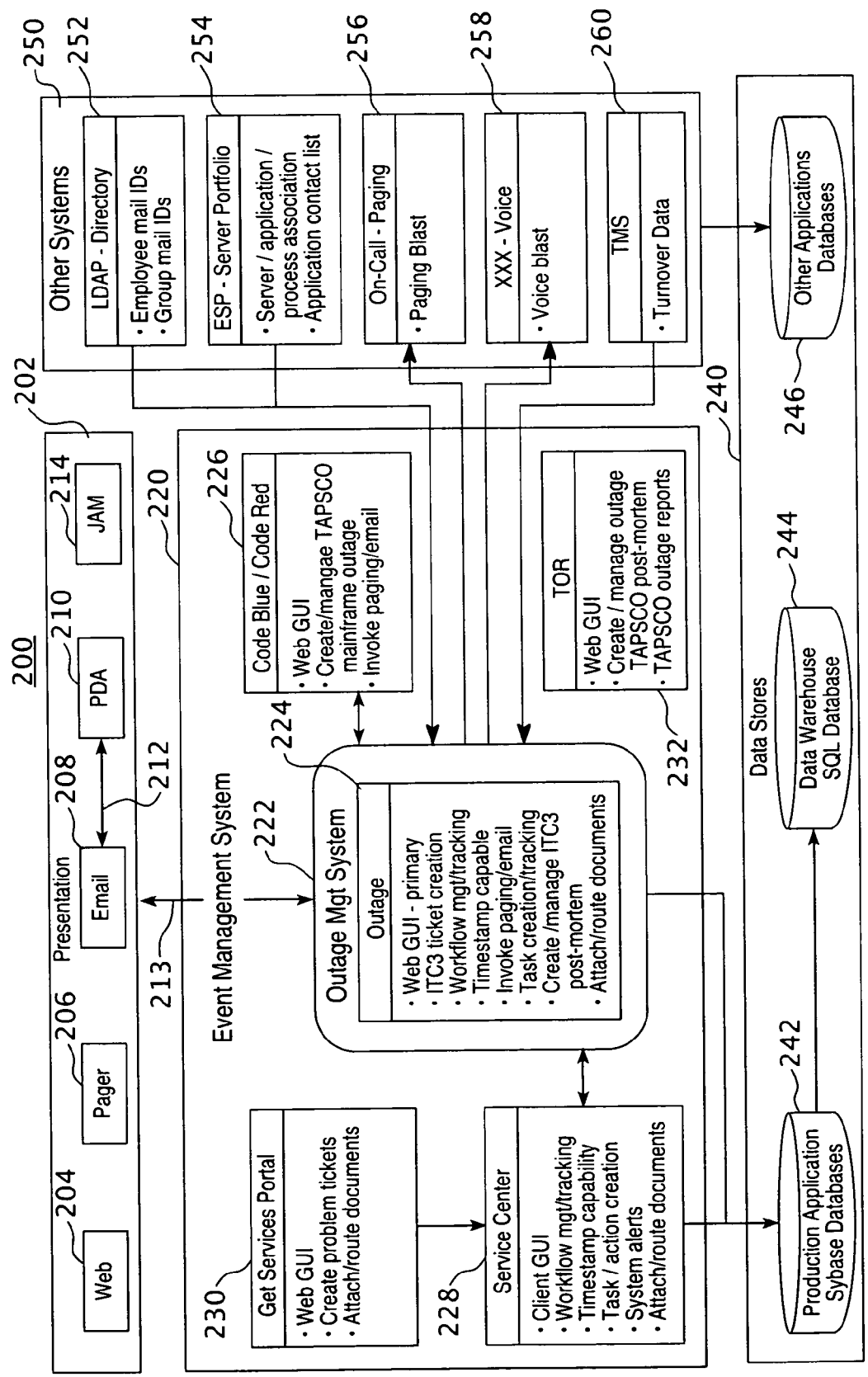
FIG. 2 illustrates one embodiment of a logical architecture of a system for managing an event.

FIG. 2 illustrates one embodiment of a logical architecture 200 for the system 10. The logical architecture 200 may comprise a presentation portion 202, an event management system portion 220 comprising an outage management system portion 222 and a data store portion 240. In other embodiments, the logical architecture 200 also may comprise other systems 250. Although the logical architecture 200 may be representative of one embodiment of the system 10 illustrated in FIG. 1, the system 10 is not necessarily limited in this context. The logical architecture 200 is not limited in the context of the illustrated embodiment.

The presentation portion 202 may comprise one or more methods of and devices for composing, sending, storing and receiving information over electronic communication systems. For example, in various embodiments, the presentation portion 202 may comprise methods and devices to compose, send, store and receive information over global, read-write information space such as the Web available via the Internet over one or more web server(s) 204. Other devices and methods may comprise one or more: pager(s) 206, email server(s) 208, personal digital assistant(s) (PDA) 210, which may be coupled to the email server 208 via a link 212 and a Java applications manager(s) (JAM) 214. The information available at the presentation portion 202 may comprise, for example, text documents, images, multimedia and many other items of information, which may be referred to as resources that may be found, accessed and cross-referenced in any possible manner. The presentation portion 202 may be coupled to the event management system portion 220 through a communication link 213.

The event management system portion 220 may comprise an outage management system portion 222. In one embodiment, the outage management system portion 222 may comprise an outage module 224 to manage an outage event that may impact an information technology system. The outage module 224 may comprise various components to enable or facilitate communication with various other modules, the presentation portion 202 and/or the data store portion 240. These components may comprise, for example, Web based graphical user interfaces (GUI) and may enable the outage management system portion 222 to create information technology center tickets, manage and/or track workflow, timestamp, invoke paging and/or email, create and/or manage information technology center events of a finished event and attach and/or route documents.

In one embodiment, the outage management system portion 222 may be coupled to a service center module 228. The service center module 228 may comprise one or more components to provide a client GUI, manage and/or track workflow, timestamp events, provide system alerts and attach and/or route documents. The service center module 228 may receive information from a services portal module 230. The services portal module 230 also may comprise or implement a web based GUI, create problem tickets and attach and/or route documents.

In one embodiment, the outage management system portion 222 may be coupled to a code module 226. The code module 226 may comprise one or more components to provide a Web based GUI, create and/or manage mainframe outages (e.g., TAPSCO mainframe outages) and invoke paging and/or email applications.

In one embodiment, the outage management system portion 222 may be coupled to a TOR module 232. The TOR module 232 may comprise one or more components to provide a Web GUI, create and/or manage mainframe outage after the occurrence of the event and provide mainframe outage reports.

In one embodiment, the outage management system portion 222 may be coupled to one or more other systems 250. The other systems 250 may comprise one or more modules. For example, the other systems 250 may comprise a lightweight directory access protocol (LDAP) directory module 252 an elemental security platform (ESP) server portfolio module 254, an on-call paging module 256, a voice module 258 and a traffic management system (TMS) module 260. Those skilled in the art will appreciate that the ESP server portfolio module 254 may provide a view of traffic flows and hosts, as well as tolls to enforce network policies. The ESP server portfolio module 254 enables system administrators to know which devices are located on their network and control what resources those devices may access. The event management system portion 220 and the other systems 250 may be coupled to the data store portion 240.

In one embodiment, the data store portion 240 may comprise one or more databases. For example, the event management system portion 220 may be coupled to a production application relational database 242. In one embodiment, the relational database 242 may be implemented as an adaptive server enterprise database made by Sybase, Inc. The relational database 242 may be coupled to a data warehouse database 244. In one embodiment, the data warehouse database 244 may be a structured query language (SQL) database. The other systems 250 may be coupled to one or more other applications databases 246, for example.

Figure 3:
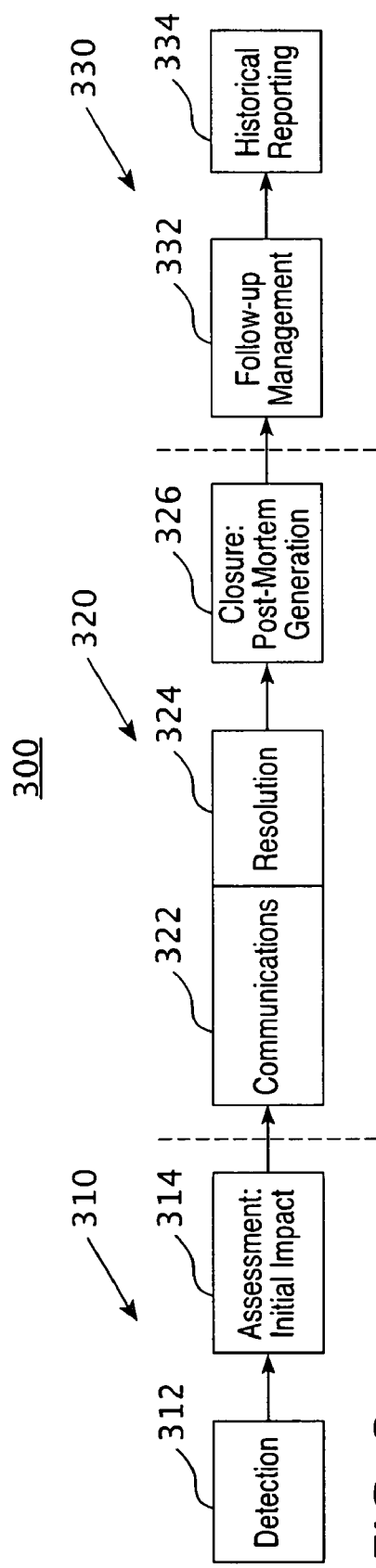
FIG. 3 illustrates one embodiment of a method for managing an event.

FIG. 3 illustrates one embodiment of a method 300 for managing an event. In one embodiment, the method 300 may be implemented to manage events and outages that may impact the enterprise technology infrastructure. One embodiment of the method 300 may comprise various portions such as: initialization 310, execution 320 and continuous improvement 330 portions, for example. As shown in FIG. 3, the initialization 310 portion may comprise a detecting 312 block to detect an event (phase 1) and an assessing 314 block to assess the initial impact (phase 2) of the event. The execution 320 portion may comprise a communicating 322 block to communicate information associated with the event (phase 3), a resolving 324 block to resolve the event (phase 4), and a closure generating 326 block to generate a report, analysis or review of the finished event (phase 5). The continuous improvement 330 portion may comprise a managing 332 block to manage the post-closure period (phase 6) and a historical reporting 334 block to generate a historical report (phase 7). The embodiments associated with the method 300 are not limited in this context.

One embodiment of the method 300 may be implemented as a highly scalable, highly efficient process and may be utilized to improve formal communications around events, incorporate cross-regional escalation notification processes to risk managers and information technology managers, identify clear roles and responsibilities within an organization and share best practices for new situations. Each block associated with each phase in the method 300, may comprise one or more processes and may involve one or more persons. For example, each block may be characterized as having one or more objectives, inputs, outputs, persons and other criteria to manage events, such as, for example, events that may impact an information technology system.

Examples of these various criteria for each block are now described with reference to FIG. 3. Accordingly, as shown in FIG. 3, the initialization 310 portion may comprise the detecting 312 block to detect an event (phase 1). One objective of the detecting 312 block may be to determine whether to escalate a process affected by the event in response to detecting the occurrence of an event. Inputs to the detecting 312 block may comprise information associated with an individual process, a technical and business assessment, a process owner, a process action item and notifications to date. The information may be provided by an outage owner and/or a core team. The outputs of the detecting 312 block may comprise an assessment in response to an event and whether or not to escalate the process (e.g., an information silo process). For example, if the assessment is negative in that the event has no impact on the process, the process remains. Otherwise, if the assessment is positive and the event does have an impact on the process, the process is escalated. Other outputs may comprise, for example, mobilization of resources, assignment of roles, notification, assessing the initial severity of an event, initial communication and schedule a meeting.

The initialization 310 portion also may comprise the assessing 314 block to assess the initial impact of an event (phase 2). Various objectives of assessing the initial impact of the event may be to get an assessment of what actually happened and the impact that the event may have on the process. Other objectives may comprise passing the initial message that an event has occurred to a technical and/or business team and identifying relevant risks and their impact on the process. Inputs to the assessing 314 block may be a roll call and a summary of current status and impact, as well as technical and business related priorities. The core team and invited non-business representatives may provide the inputs to the assessing 314 block. The outputs of the assessing 314 block may comprise, for example, assessing the firm-wide impact, implementing an action plan, assigning roles including a senior level communicator, implementing a communication plan and executing a communication/notification plan.

The execution 320 portion may comprise the communicating 322 block to communicate information associated with the event (phase 3). The communicating 322 block may comprise providing relevant event (e.g., outage) information which may be used for decision making/risk management. A technical and business assessment may be conducted to determine the severity and/or impact of the event. The communication may involve the core team, a team to conduct business communication at the operational level, for example, information technology and business risk level managers and a group to determine technical turnover and/or reengineering. Additionally, senior level strategic communication may involve communicating to the business risk managers and business level leaders. The communicating 322 block may be implemented via conference calls, prioritization of updated action plan activities and/or point in time communication.

The execution 320 portion also may comprise the resolving 324 block to resolve the event (phase 4). Resolution actions may comprise, for example, resolving an outage, executing a contingency plan and/or workarounds, mobilizing technical resources and providing updates to the core team. The resolving 324 block may receive event information such as definitions and scope of the problem, technical and business priorities, historical workarounds, work performed to-date, turnovers, configuration management and/or time constraints. This information may be provided by the event manager (e.g., outage manager), core team facilitators and/or technical resources. Based on the event information communicated in the communicating 322 block, the resolving 324 block may provide suitable workarounds, estimated time of arrival (ETA), latest statements for communicating, updated action plan, escalation information, change ticket and/or communication.

The execution 320 portion also may comprise the closure generating 326 block to generate an analysis, review or report of the finished event (phase 5). The closure generating 326 block report of the finished event may comprise creating and distributing a document, including timeline, impact, follow-ups and process feed-back after the event is finished. The information inputs may comprise all documents and communication related to the event, participation of team members, impact analysis and/or third party inputs. The input may be provided by the event manager owner (e.g., outage manager owner), chaser function, process owners and information technology and/or business team members. The closure generating 326 block output may comprise a document, assignment for follow-ups, action plan and/or communication after the event is finished.

The continuous improvement 330 portion may comprise the managing 332 block to manage the post-closure period (phase 6) (e.g., follow-up management phase). During the post-closure period, the managing 332 block may comprise ensuring that action items are executed, continuously improving processes and ensuring ultimate closure. Information input may comprise action items, team updates and/or cost/benefit and risk assessments after the event is finished. Managing the post-closure period may be implemented by silo representatives assigned and responsible for follow-up and/or the core team. During the post-closure period, the managing 332 block may provide spin-off projects (which may be tracked in an outage process but closed in follow-up process), reports to risk management, information technology management center (ITMC) and/or information technology.

The continuous improvement 330 portion also may comprise the historical reporting 334 block to generate a historical report (phase 7). Generating the historical report may comprise holistic views into the event environment and providing sufficient data so management can make informed decisions. Information input may comprise any output of any other blocks (e.g., 312, 314, 322, 324, 326 and/or 332), which may be referred to herein as the event data. The historical reports may be generated by any process owners, business unit, ITMC, risk management group and/or representative groups, for example. Generating the historical reports may provide process metrics, stability metrics (e.g., multiple views, risk impact, etc.) and/or report review meetings.

FIGS. 4-14 illustrate various examples of information provided by the system 10 during the execution of the above-described method. The information may be presented on a display screen to a user and may be available on an event by event basis.

The information shown in FIG. 4 is an example of one embodiment of a welcome screen shot 400 that may viewed by a user (e.g., a process owner) during the detection phase of an event (detecting 312 block FIG. 3). A brief description of the event is provided in the "Outage Brief Description" field 402. In the illustrated welcome screen shot 400, the "Outage Brief Description" field 402 shows that the outage event is a server that does not re-start. The information may be utilized to invoke the event. During this time period, the process owner may perform data entry, select participants to join an assessment, invoke tickets, extract data, etc. The user may enter a description of the outage event in the problem description field 404 and also may enter the business impact of the outage event in the business impact field 406. Participation may be selected in the setup core team section 408 and tickets may be invoked in the initiate, email, JAM and beep section 410.

Figure 5:
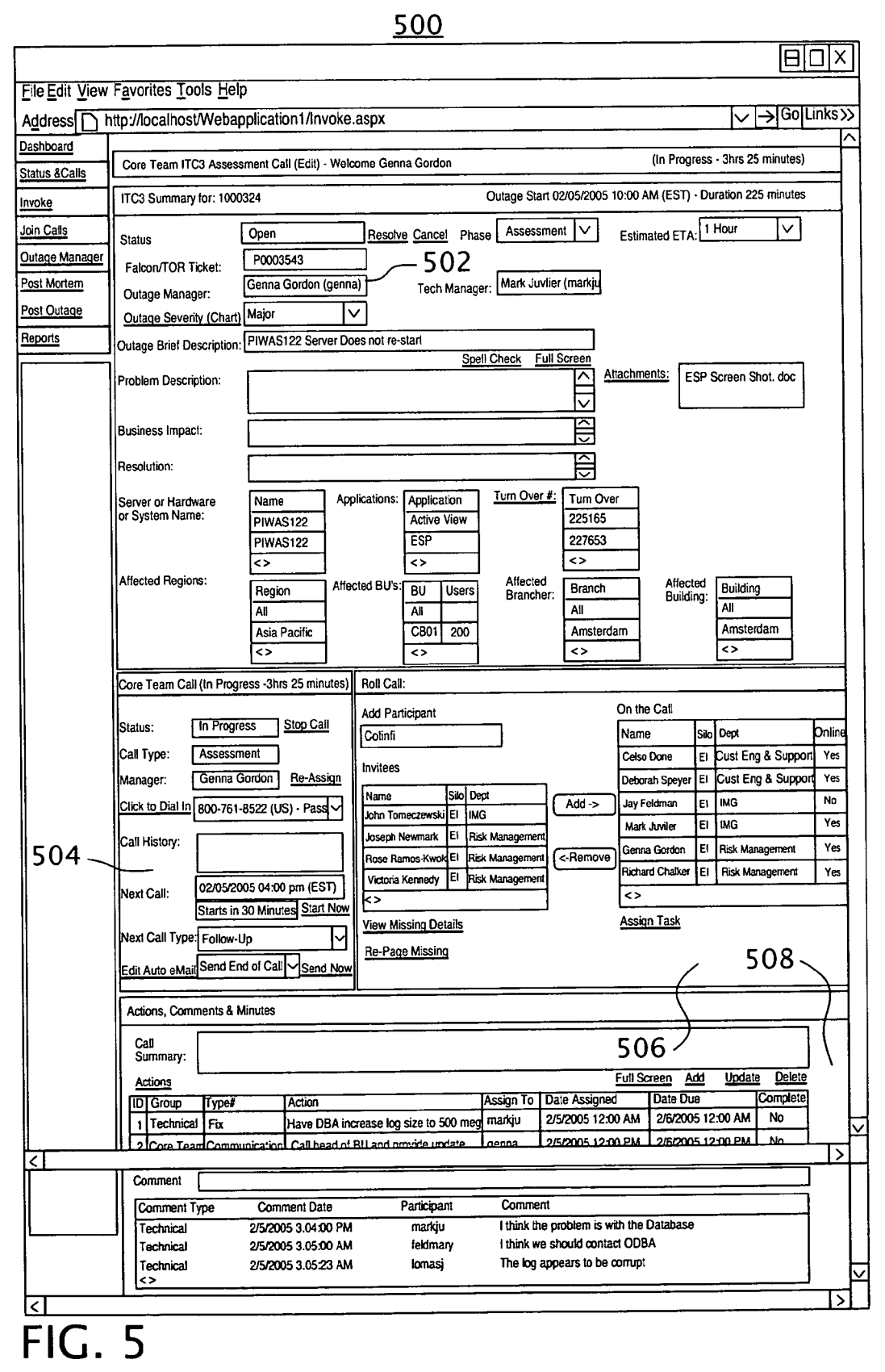

The information shown in FIG. 5 is an example of one embodiment of a core team edit screen shot 500 that may be viewed by a user (e.g., an outage manager) defined in the outage manager field 502 during the assessment (assessing 314 block in FIG. 3), communications (communicating 322 block FIG. 3) and resolution (resolving 324 block FIG. 3) phases of the event. During this time period, as shown in the core team edit screen shot 500, the outage manager may join/manage a core team assessment telephone conference in section 504, assign roles in section 506, identify and/or assign action items, create additional follow-up calls and email minutes in section 508.

The information shown in FIG. 6 is an example of one embodiment of a core team assessment call screen shot 600 that may be viewed by a user (e.g., a core team participant) as shown in the name field 604. The participants on the call are shown in the chart 602 section of the core team assessment call screen shot 600. The user may view the information displayed in the core team assessment call screen shot 600 during the assessment (assessing 314 block FIG. 3) and communications (communicating 322 block FIG. 3) phases of the event. During this time period, as shown in the core team assessment call screen shot 600, the core team participant may join the core team assessment telephone conference in section 606, view outage details in section 608 and create actions in section 610.

The information shown in FIG. 7 is an example of one embodiment of an outage manager administration screen shot 700 that may be viewed by a user (e.g., an outage manager) as shown in the outage manager field 702. The outage manager administration screen shot 700 may be viewed during the assessment (assessing 314 block FIG. 3) and communications (communicating 322 block FIG. 3) phases of the event. During this time period, as shown in the outage manager administration screen shot 700, the outage manager may modify details, change status and cancel the event at any point in the outage life cycle in the manage calls in sections 704, 706, 708.

Figure 8:
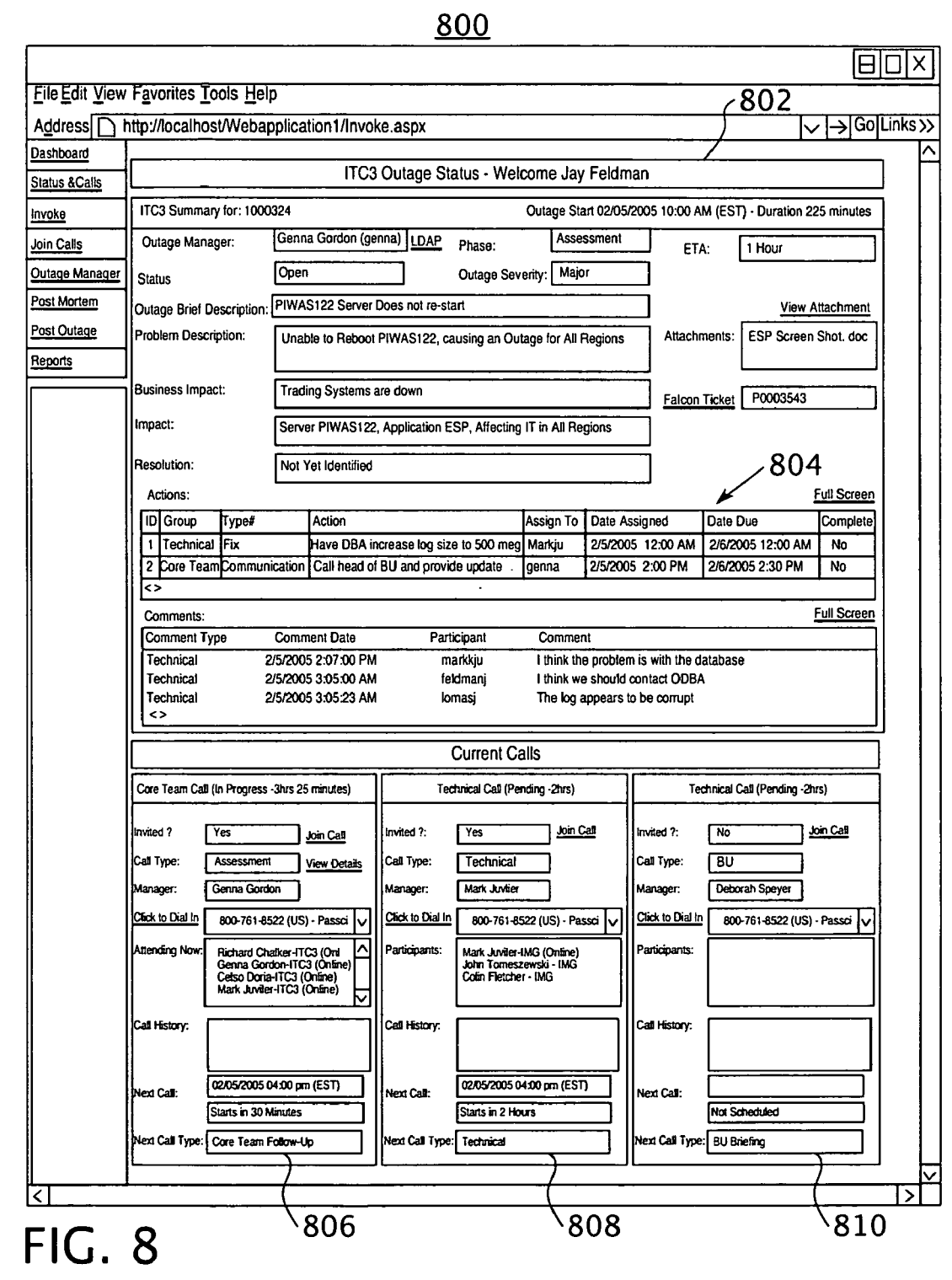

The information shown in FIG. 8 is an example of one embodiment of an outage status screen shot 800 that may be viewed by a user (e.g., an employee of a financial services entity) as identified in the outage status tab 802. The outage status screen shot 800 may be viewed during the assessment (assessing 314 block FIG. 3) and communications (communicating 322 block FIG. 3) phases of the event. During this time period, the employee may view a high-level communications schedule 804 and join any call in progress or scheduled in the current calls sections 806, 808, 810 of the outage status screen shot 800.

The information shown in FIG. 9 is an example of one embodiment of a technical follow up call screen shot 900 that may be viewed by a user (e.g., a technical participant) as identified in the technical follow up call tab 902. The technical follow up call screen shot 900 may be viewed during the communications (communicating 322 block FIG. 3) phase of the event. During this time period, the technical participant may join a technical telephone conference, view outage event details and create actions in the technical follow up call sections 904, 906 of the technical follow up call screen shot 900.

The information shown in FIG. 10 is an example of one embodiment of a business unit (BU) briefing call screen shot 1000 that may be viewed by a user (e.g., a business unit participant) as identified in the BU briefing call tab 1002. The BU briefing call screen shot 1000 may be viewed during the communications (communicating 322 block FIG. 3) phase of the event. During this time period, the business unit participant may join a business unit briefing, view outage event details and create actions in the BU briefing call sections 1004, 1006 of the BU briefing call screen shot 1000.

Figure 11:
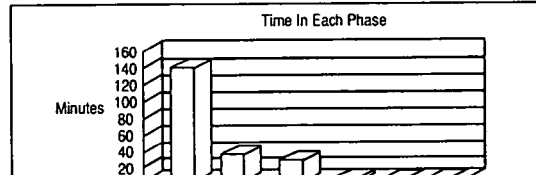

The information shown in FIG. 11 is an example of one embodiment of a screen shot 1100 after a finished event that may be viewed by a user (e.g., an outage manager) as identified in the outage manager field 1102. The screen shot 1100 after a finished event may be viewed during the post mortem (closure generating 326 block FIG. 3) and managing (managing 332 block FIG. 3) phases of the event. During this time period, the outage manager may record pertinent technical and process information regarding the outage event for future reporting and analysis purposes in section 1104 of the screen shot 1100 after a finished event.

The information shown in FIG. 12 is an example of one embodiment of a post outage follow up screen shot 1200 that may be viewed by a user (e.g., an employee of a financial services entity) as identified in the post outage follow up tab 1202. The post outage follow up screen shot 1200 may be viewed during the managing (managing 332 block FIG. 3) phase of the event. During this time period, the employee may manage large follow-up actions from an outage event following the resolution (resolving 324 block FIG. 3) and post mortem (closure generating 326 block FIG. 3) phases of the event. This is shown in the summary section 1204 of the post outage follow up screen shot 1200.

Figure 13:
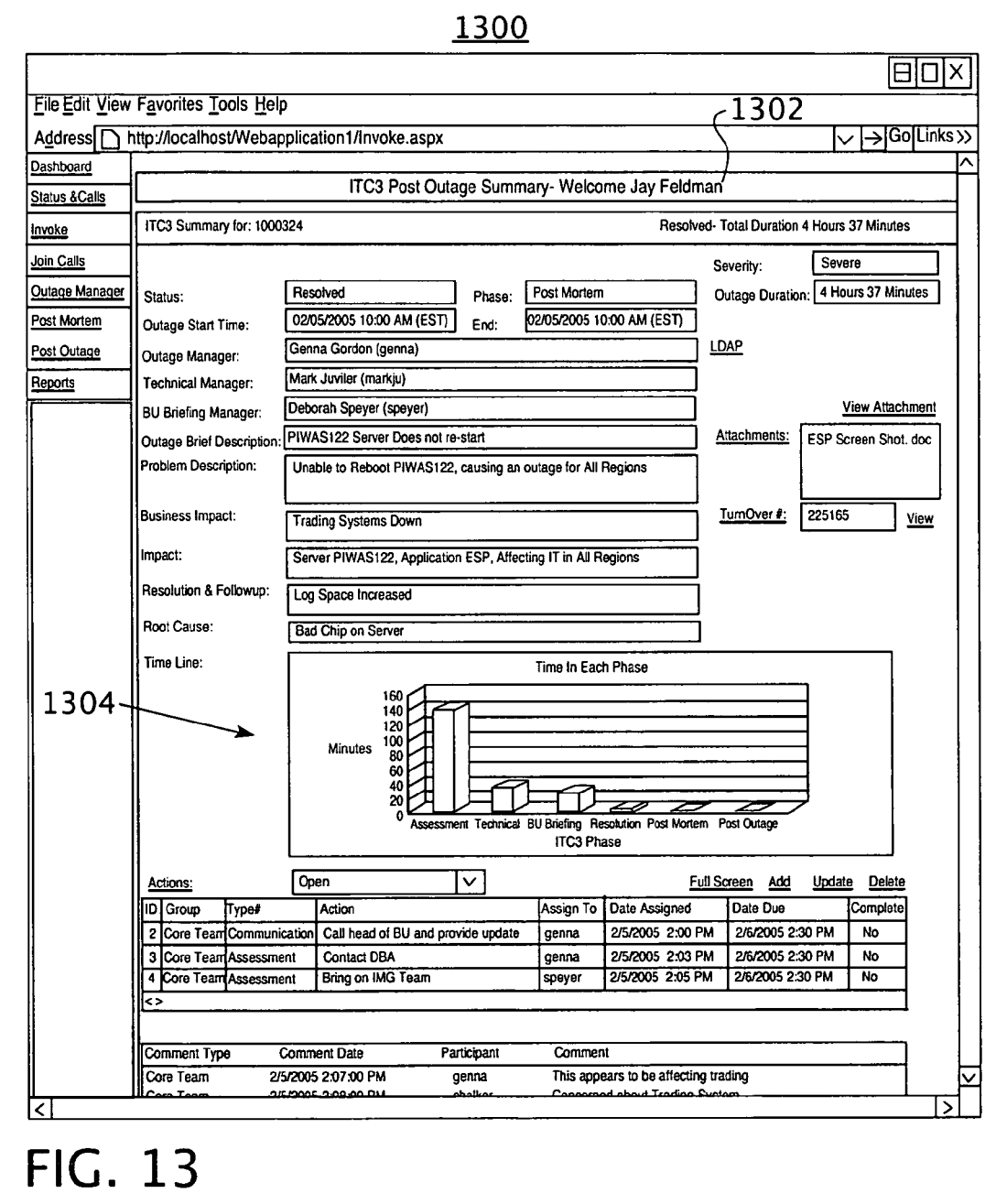

The information shown in FIG. 13 is an example of one embodiment of an outage summary screen shot 1300 that may be viewed by a user (e.g., an employee of a financial services entity) as identified in the outage summary tab 1302. The outage summary screen shot 1300 may be viewed during all phases of the event. During this time period, the employee may produce a formatted summary that can be emailed and/or sent to a printing device in the summary section 1304 of the outage summary screen shot 1300.

Figure 14:
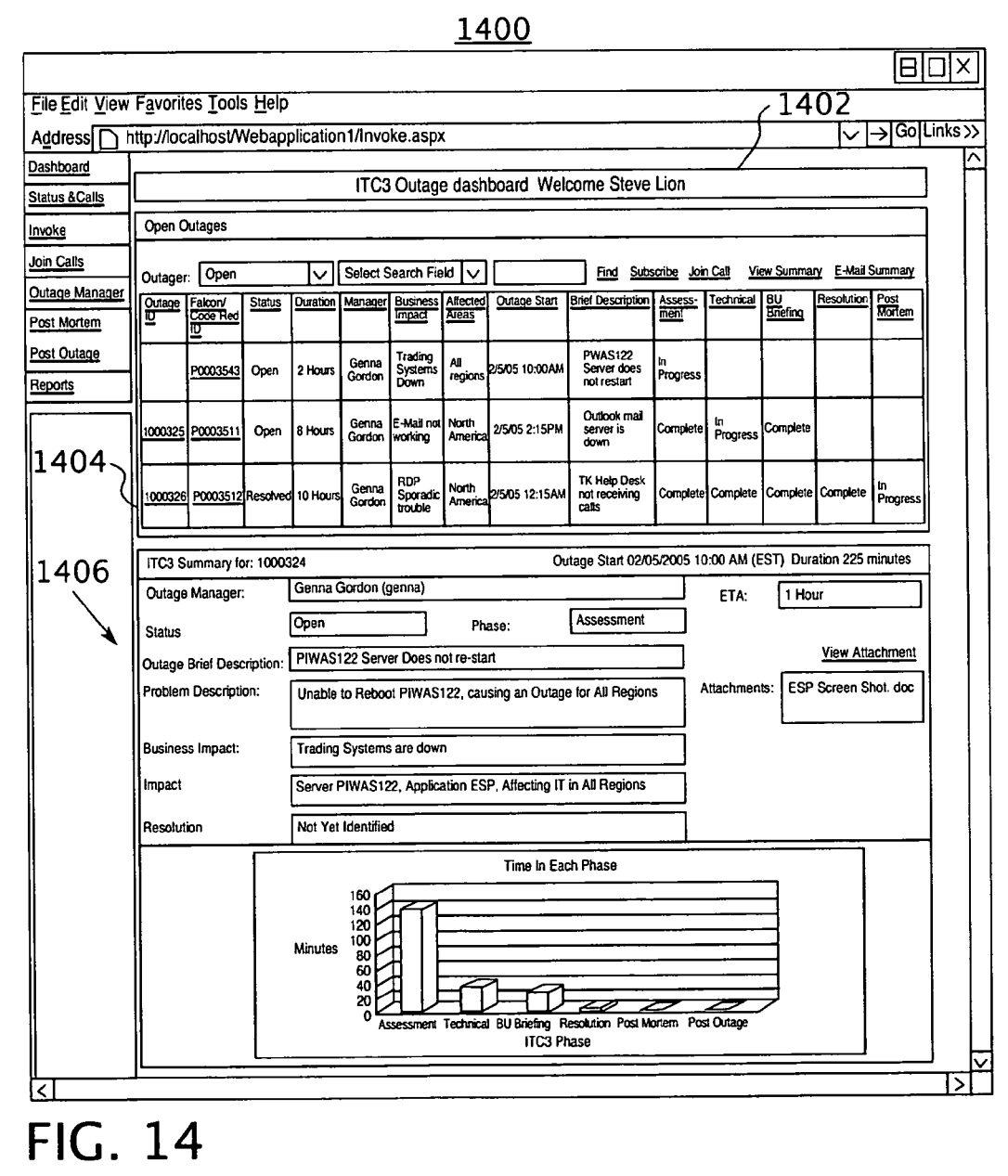

The information shown in FIG. 14 is an example of one embodiment of an outage dashboard screen shot 1400 that may be viewed by a user (e.g., an employee of a financial services entity) as identified in the outage dashboard tab 1402. The outage dashboard screen shot 1400 may be viewed during all phases of the event. During this time period, the employee may gain a high-level view of an outage event by filtering on status and drill-down to view outage event details in the open outages 1404 and summary sections 1406 of the outage dashboard screen shot 1400.

The benefits of the disclosed methods, systems and computer-readable media are readily apparent to those skilled in the art. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves. The various portions and components of various embodiments of the disclosed invention can be implemented in computer software code using, for example, Visual Basic, C, or C++ computer languages using, for example, object-oriented techniques.

While several embodiments of the invention have been described, it should be apparent, however, that various modifications, alterations and adaptations to those embodiments may occur to persons skilled in the art with the attainment of some or all of the advantages of the disclosed invention.

Therefore, this application is intended to cover all such modifications, alterations and adaptations without departing from the scope and spirit of the disclosed invention as defined by the appended claims.

The invention claimed is:

1. A computer-implemented method for collaborative management of information technology infrastructure events, comprising:
   receiving, by an event management computer system, event information identifying an event impacting an information technology infrastructure of an enterprise;
   communicating, by the event management computer system, information about the event to a first user data communication device, the first user data communication data device having a display for displaying the information about the event, wherein the first user data communication device is associated with an owner of a process affected by the event;
   receiving, by the event management computer system, from the owner via the first user data communication device, a selection of at least one participant for a core team to assess the event and at least one additional detail about the event;
   communicating, by the event management computer system, information about the event to a second user data communication device, wherein the second user data communication device is associated with the at least one core team participant, wherein the information includes the at least one additional detail; and
   during a core team assessment call involving at least the owner and the at least one participant:
      displaying manager information on the display of the first user data communication device, wherein the manager information comprises names of the participants on the core team assessment call and a status of the core team assessment call;
      displaying core team information on a display of the second user data communication device, wherein the core team information comprises names of the participants on the core team assessment call and the at least one additional detail;
      receiving, by the event management computer system, a description of at least one corrective action in response to the event created by the at least one participant;
      displaying the description of the at least one corrective action on the display of the first user data communication device;
      displaying a communications schedule to a third user data communication device, wherein the third user data communication device is associated with one of an enterprise employee, a technical participant, and a business unit participant, wherein the communications schedule graphically identifies a plurality of calls related to the event, wherein the plurality of calls comprises at least one scheduled call and the core team assessment call in progress; and
      upon receiving a selection of the core team assessment call from the communications schedule, telephonically joining one of the enterprise employee, the technical participant, and the business unit participant to the core team assessment call.

2. The method of claim 1, further comprising:
   executing corrective actions to resolve the event, wherein the executing comprises:
      communicating information associated with the event;
      resolving the event; and
      generating a report after the completion of the event.

3. The method of claim 1, further comprising:
   monitoring the corrective actions after the event is resolved to continuously improve the process, wherein the monitoring comprises:
      managing a post-closure period after the completion of the event; and
      generating a historical report.

4. A computer-implemented method for collaborative management of information technology infrastructure events, comprising:
   displaying, by an event management computer system, one or more user interfaces on a display screen of a first user data communication device during one or more phases of an event associated with a process to provide or receive information associated with the event, wherein the first user data communication device is associated with an owner of the process affected by the event;
   through the one or more user interfaces, receiving, by the event management computer system, first information comprising a name of at least one individual associated with an assessment call;
   through the one or more user interfaces, receiving, by the event management computer system, second information comprising a description of the event;
   through the one or more user interfaces, receiving, by the event management computer system, third information comprising a business impact of the event; and
   during a core team assessment call involving at least the owner and the at least one individual:
      communicating, by the event management computer system, at least one of the first, second, and third information via the one or more user interfaces to a second user data communication device, wherein the second user data communication device is associated with the at least one individual;
      displaying manager information on the display of the first user data communication device, wherein the manager information comprises names of the participants on the core team assessment call and a status of the core team assessment call;
      displaying core team information on a display of the second user data communication device, wherein the core team information comprises names of the participants on the core team assessment;
      receiving, by the event management computer system, a description of at least one corrective action in response to the event created by the at least one individual;
      displaying the description of the at least one corrective action on the display of the first user data communication device;
      displaying a communications schedule to a third user data communication device, wherein the third user data communication device is associated with one of an enterprise employee, a technical participant, and a business unit participant, wherein the communications schedule graphically identifies a plurality of calls related to the event, wherein the plurality of calls comprises at least one scheduled call and the core team assessment call in progress; and upon receiving a selection of the core team assessment call from the communications schedule, telephonically joining one of the enterprise employee, the technical participant, and the business unit participant to the core team assessment call.

5. The method of claim 4, comprising resolving the impact of the event on the process.

6. The method of claim 4, comprising generating at least one of a report, analysis and a review of the event.

7. The method of claim 4, comprising managing a post-closure period after the event is resolved to execute action items and improve the process.

8. The method of claim 4, comprising generating a historical report of the event.

9. An article comprising a non-transitory computer readable medium having instruction stored thereon, which when executed by a processor cause the processor to:
  display one or more user interfaces on a display screen of a first user data communication device during one or more phases of an information technology infrastructure event associated with a process to provide or receive information associated with the event;
  receive first information by the first user data communication device through the one or more user interfaces comprising a name of at least one individual associated with an assessment call;
  receive second information by the first user data communication device through the one or more user interfaces comprising a description of the event;
  receive third information by the first user data communication device through the one or more user interfaces comprising a business impact of the event; and
  communicate, during a core team assessment call involving at least the owner and the at least one individual, the first, second, and third information via the one or more user interfaces to a second user data communication device, wherein the second user data communication device is associated with the at least one individual;
  display, during the core team assessment call, manager information on the display of the first user data communication device, wherein the manager information comprises names of the participants on the core team assessment call and a status of the core team assessment call;
  display, during the core team assessment call, core team information on a display of the second user data communication device, wherein the core team information comprises names of the participants on the core team assessment;
  receive, during the core team assessment call, a description of at least one corrective action in response to the event created by the at least one individual;
  display, during the core team assessment call, the description of the at least one corrective action on the display of the first user data communication device;
  display a communications schedule to a third user data communication device, wherein the third user data communication device is associated with one of an enterprise employee, a technical participant, and a business unit participant, wherein the communications schedule graphically identifies a plurality of calls related to the event, wherein the plurality of calls comprises at least one scheduled call and the core team assessment call in progress; and
  upon receiving a selection of the core team assessment call from the communications schedule, telephonically join one of the enterprise employee, the technical participant, and the business unit participant to the core team assessment call.

10. The article of claim 9, wherein the instructions cause the processor to resolve the impact of the event on the process.

11. The article of claim 9, wherein the instructions cause the processor to generate at least one of a report, analysis and a review of the event.

12. The article of claim 9, wherein the instructions cause the processor to manage a post-closure period after the event is resolved to execute action items are and improve the process.

13. The article of claim 9, wherein the instructions cause the processor to generate a historical report of the event.

* * * * *